US010162045B2

(12) United States Patent
Hesse (10) Patent No.: US 10,162,045 B2
(45) Date of Patent: Dec. 25, 2018

(54) RADAR UNIT AND METHOD FOR OPERATING A RADAR UNIT (71) Applicant: Hella KGaA Hueck & Co., Lippstadt (DE)

(72) Inventor: Thomas Hesse, Paderborn (DE)

(73) Assignee: Hella GmbH & Co. KGaA, Lippstadt (DE)

(*) Notice: Subject to any disclaimer, the term of this patent is extended or adjusted under 35 U.S.C. 154(b) by 537 days.

(21) Appl. No.: 14/513,580

(22) Filed: Oct. 14, 2014

(65) Prior Publication Data

US 2016/0154093 A1 Jun. 2, 2016

(30) Foreign Application Priority Data

Oct. 18, 2013 (DE) .................. 10 2013 111 512

(51) Int. Cl.
G01S 7/40 (2006.01)
G01S 7/03 (2006.01)
G01S 7/35 (2006.01)
G01S 13/48 (2006.01)
G01S 13/93 (2006.01)

(52) U.S. Cl.
CPC .............. *G01S 7/4008* (2013.01); *G01S 7/03* (2013.01); *G01S 7/35* (2013.01); *G01S 7/40* (2013.01); *G01S 13/48* (2013.01); *G01S 13/93* (2013.01)

(58) Field of Classification Search
CPC . G01S 7/4008; G01S 7/03; G01S 7/35; G01S 13/48; G01S 13/93; G01S 7/40
See application file for complete search history.

(56) References Cited

U.S. PATENT DOCUMENTS 4,600,892 A * 7/1986 Wagner .................. G01S 7/023
327/155
5,101,211 A * 3/1992 DuFort .................. G01S 7/032
330/107

(Continued)

FOREIGN PATENT DOCUMENTS

DE 19803660 A1 8/1999
DE 102009027368 A1 1/2011
DE 102011055693 A1 5/2013

(Continued)

*Primary Examiner* — Matthew M Barker
(74) *Attorney, Agent, or Firm* — Husch Blackwell LLP (57) ABSTRACT The invention relates to a radar unit for transmitting and receiving a signal in a frequency band. The invention includes a control means and each of a transmission path and a receiving path. The transmission path includes
 an output unit for generating a transmission signal and a transmission antenna for emitting a transmission signal.
The receiving path receives, processes, and relays a received signal, and has at least one receiving antenna for receiving the received signal.
The control means is configured to activate the transmission path and to process the received signal.
The transmission path, the receiving path, and the control means are configured to toggle the transmission output by means of a mono-frequency switching sequence, and to detect the frequency of the switching sequence in the receiving path. Furthermore, the invention provides a method for operating a radar unit, in particular, a method for monitoring a transmission output of the radar unit.

5 Claims, 4 Drawing Sheets (56) References Cited

U.S. PATENT DOCUMENTS 7,724,802 B2* 5/2010 Honda .................. G01S 7/35
375/130
7,932,854 B2* 4/2011 Ando .................. G01S 3/74
342/133

FOREIGN PATENT DOCUMENTS

DE 102012201990 A1 8/2013
EP 2392944 A1 12/2011

* cited by examiner

RADAR UNIT AND METHOD FOR OPERATING A RADAR UNIT

CROSS REFERENCE

This application claims priority to German Application No. 10 2013 111512.8, filed Oct. 18, 2013, which is hereby incorporated by reference.

TECHNICAL FIELD

The invention relates to a radar unit, and a method for operating a radar unit.

BACKGROUND

A radar unit can emit electromagnetic waves bundled into a primary signal, and receive the signals reflected from an object, and evaluate these according to manifold requirements and fields of application. In this manner, data regarding the object can be obtained, for example, a distance to the object, a relative movement between the transmitter (radar unit) and the object, as well as the shape of the object. Radar units are used in air traffic control, as weather radar, for research purposes in astronomy, for tracking targets in air defense, for monitoring buildings, and in a motor vehicle for monitoring the vehicle environment, to name just a few examples. Radar units can be designed as mobile and stationary radar units.

The requirements for the radar units that can be used in the vehicle assistance system of the motor vehicle are manifold, in particular, the radar unit must be able to be integrated in the motor vehicle without difficulties. For this, sensors for the radar unit are preferably disposed in the region of the motor vehicle bumper, behind the respective bumper, for example. The monitoring of the vehicle environment requires of the radar unit that an object must be able to be detected at an early stage, by means of which a special requirement is defined for the range of the radar unit that is implemented. Furthermore, a satisfactory distinction of objects is necessary, resulting in a high demand on the distance resolution being required, in particular in close range.

The range of a radar unit is determined by the mean transmission output. Deviations in the transmission output and/or a drift in the transmission output that has been set can lead to an imprecise determination of the distance, and should be avoided. For this reason, it is important in the operation of the radar unit that the transmission output be monitored and that it be possible to detect defects in the hardware of the radar unit in a timely manner.

A radar unit is known from DE 10 2011 055 693 A1, having a transmission path and a receiving path with two receiving channels and a control means, and is configured for detecting a channel malfunction in the receiving channel. For this, the input of an oscillator in the transmission path is connected to the control means, and the oscillator can be activated by the control means in order to generate a signal. The receiving channel is configured for receiving the signal returning from the object. The channel malfunction can be detected in that the control means is configured to activate the oscillator for generating a first signal component, which contains signal components, the frequencies of which exhibit a lower cutoff frequency for the frequency band, and an upper cutoff frequency for the frequency band, wherein the signal fragments with the lower cutoff frequency and the signal fragments with the upper cutoff frequency can be generated in an alternating manner.

SUMMARY OF THE INVENTION

The objective of the invention is to create an improved radar unit and to provide a method for operating the radar unit.

The radar unit is configured for transmitting and receiving a signal in a frequency band, and comprises a control means, a transmission path having an output unit for generating a transmission signal, and a transmission antenna for emitting the transmission signal, and furthermore, a receiving path for receiving, processing and relaying a received signal, wherein the transmission path and the control means are configured to toggle the transmission output by means of a mono-frequency switching sequence, and to detect the frequency of the switching sequence in the receiving path. By this means the transmission output of the radar unit can be monitored. A hardware malfunction can be detected in that the frequency of the switching sequence cannot be measured in the receiving path. The transmission path can thus be monitored during the operation of the radar unit or in a separate calibration and diagnosis cycle. Preferably, the transmission signal, which lies in the 24 GHz range, is superimposed thereby with a switching sequence having a frequency other than 24 GHz. By this means, a variability of the transmission output can be reliably checked. In doing so, both with radar units of the generation 2.0 as well as generation 3.0, the monitoring and diagnosis concept can be used for determining a variability of the transmission output.

Preferably an output sensor is provided, which is configured to register the generated transmission output by means of a measurement signal. The output sensor enables a direct internal measurement of the transmission signal before it has been emitted. The actual output of the transmission signal from the radar unit, that has been generated in the output unit and is to be emitted, can be registered by means of the measurement signal. Thus, by comparing a pre-defined target output with the actual transmission output (actual output) registered by means of the measurement signal, a drift in the transmission output can be reliably detected by means of the measurement signal. The drift in the transmission output can, for example, be caused by a change in temperature in the environment of the output unit. By this means, a monitoring of the functionality of the transmission path in its entirety and, in particular, of the output unit, is made possible.

In a preferred embodiment, the output sensor is connected to the transmission antenna and the output unit. Preferably the output sensor is disposed between the output unit and the transmission antenna. The output sensor is an integrated output sensor, which is integrated in the radar unit, preferably disposed in the immediate vicinity of, or adjacent to, the output unit. This is advantageous in comparison with an external output sensor. By this means, it can be ensured that the output sensor can directly register the signal that is to be emitted, specifically, before it is emitted.

Preferably a high frequency circuit is provided, in particular an MMIC (Monolithic Microwave Integrated Circuit), which is configured to execute the processing of the received signals, the activation of the output unit in the transmission path, and the processing of the measurement signal from the output sensor. The essential electronic components of the radar unit, such as a voltage controlled oscillator (VCO), an output unit, an output sensor, and the electronic components for the receiving path, are preferably integrated in the MMIC. Preferably the high frequency circuit is connected to the control means.

Preferably the high frequency circuit has an MMIC activation unit and a multiplexer connected to the output sensor, wherein the MMIC activation unit is connected to the output unit and the multiplexer. Preferably the MMIC activation unit and the multiplexer are likewise integrated on the MMIC. As a result, values fed or programmed into the output unit pertaining to the transmission output can be fed into the multiplexor as target values, and compared with the measured measurement values for the output sensor (actual values). By this means it is possible to determine a deviation between the target value and the measured actual value. In this manner, the MMIC activation unit and the output sensor can represent a control path for the radar unit. The radar unit can execute a control of the high frequency circuit disposed in the transmission path, in particular an MMIC, by means of the measurement signal from the output sensor.

Preferably the output sensor and the multiplexer are connected to the control means. In this manner, it is possible to obtain a control of the output unit by the control means. A digital/analog converter (DAC) can be disposed between the control means and the output unit, which can convert the digital output signal of the control means into an analog signal. The analog signal can be fed into the output unit.

For this, the measurement signal can be used for controlling the voltage controlled oscillator (VCO) of the MMIC, and thus, the VCO output signal can be controlled and regulated. The transmission signal can preferably be generated in and by the VCO, which is connected to the output unit. By this means, a diagnosis of the variability of the transmission output is enabled, a monitoring of the measuring capability of the transmission output can be executed, and the transmission output of the transmitted signals on the whole can be monitored.

The control means comprises a digital signal processor (DSP) having a serial peripheral interface (SPI), which is configured for programming the MMIC control unit in the control path.

Furthermore, a multiplexer (MUX) is preferably provided in the control path, which is connected to an analog/digital converter (ADC) of the digital signal processor (DSP), and is configured for feeding the measurement signals generated by the output sensor into the digital signal processor (DSP). By this means, the measurement signal can be used for activating the MMIC control unit. The measurement signal can be converted into an analog signal thereby, which can then be processed further.

Preferably the transmission output can be set in eight discreet steps. By this means, a sufficient precision can be ensured.

For this, the multiplexer (MUX) is connected with the MMIC control unit, and can be activated by means of the MMIC control unit. In this manner, a target value for the transmission output, which is fed into the output unit by means of the MMIC control unit, can simultaneously be fed into the multiplexer, a target value/actual value comparison can be executed, and the results of this comparison can be fed into the DSP, and further conveyed to the MMIC control unit by means of the SPI in order to activate the output unit. In this manner, a tracking of the transmission output by means of the measurement signal is enabled.

The method for operating a radar unit, in particular for monitoring the transmission output of the radar unit, exhibits the use of a mono-frequency switching sequence on the transmission signal, and the detection of the frequency of the switching sequence in the receiving path. By this means it can also be reliably determined whether an intended readjustment of the transmission output has actually taken place. The readjustment can be carried out thereby in a variety of ways. It can, on one hand, occur by means of a function for regulating the transmission output that has been programmed in the radar unit, a temperature/transmission output function, for example, or by means of an active tracking based on the analysis of the generated transmission output of the transmission signal. By this means, the variability of the transmission output of the radar unit can be reliably verified and checked. It is advantageous thereby that a method is created, by means of which a constant transmission output can be ensured. In particular, a constant transmission output can be ensured over the entire specific temperature range of the radar unit in operation.

In one design of the method, a measurement signal is generated by means of a measurement of a transmission signal output prior to emitting the transmission signal, and the use of the measurement signal for the measured transmission signal output is used to control and regulate the transmission signal output. This enables an explicit internal measurement of the currently applied transmission output. Thus, the measurement capability of the transmission output can be reliably verified and monitored.

Preferably a hardware malfunction can be detected by means of the analysis of the measurement signal, in particular in that an absence of the measurement signal from the output sensor is registered. Thus, the method according to the invention can supplement the diagnosis of a hardware malfunction by means of the diagnosis module "channel malfunction" in DE 10 2011 055 693 A1 cited in the introduction. By detecting the measurement signal, the possibility of a hardware malfunction can be eliminated. Both a hardware defect in the transmission path and in the receiving path can be detected.

Preferably a hardware malfunction can be determined thereby, in that an absence of the switching sequence in the receiving path is detected.

In detail, the method for determining the measurement capability of the transmission output can comprise the following steps:
generation of a transmission signal having a transmission frequency and a transmission signal output in an output unit of a radar unit,
measurement of the transmission signal output with an output sensor,
comparison of the measured signal output with the signal output that has been set (target value/actual value comparison),
if a difference between the actual transmission signal output and the target transmission signal output is detected, re-adjustment of the transmission signal output to the target value.

The transmission signal has, in addition to the constant 24 GHz VCO frequency, an amplitude modulated component in frequencies above and below the VCO frequency, wherein the differences of these frequencies from the VCO frequency amounts to $\pm N \times 10$ kHz, N=1, 2, 3, . . . . The transmission signal output preferably alternates between a maximum and a minimum value, wherein the transmission frequency itself is set at a fixed value. A typical duration of a single transmission output that has been set amounts to 50 µs.

The method comprises, preferably after the detection of the measurement signal by means of the output sensor, a Fourier transformation. This enables an analysis of the measurement signal and a filtering out of individual frequency components.

A hardware malfunction can also be with the method detected by means of the measurement signal, in that an absence of the measurement signal is registered.

For this it is advantageous that the emitted transmission output can be very reliably monitored, independently of the sensor environment. Furthermore, the transmission output can be adjusted in an adaptive manner, thus, then, when the transmission output has changed due to environmental effects such as a change in temperature, this can always be reliably registered and detected, and the output unit can be updated and readjusted. By this means, a constant transmission signal output can be obtained, in particular over a broad temperature range. In comparison with the tracking algorithms that have been permanently programmed in known radar units, this can be reliably detected with the new method, even in the event of a hardware malfunction or a hardware defect.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
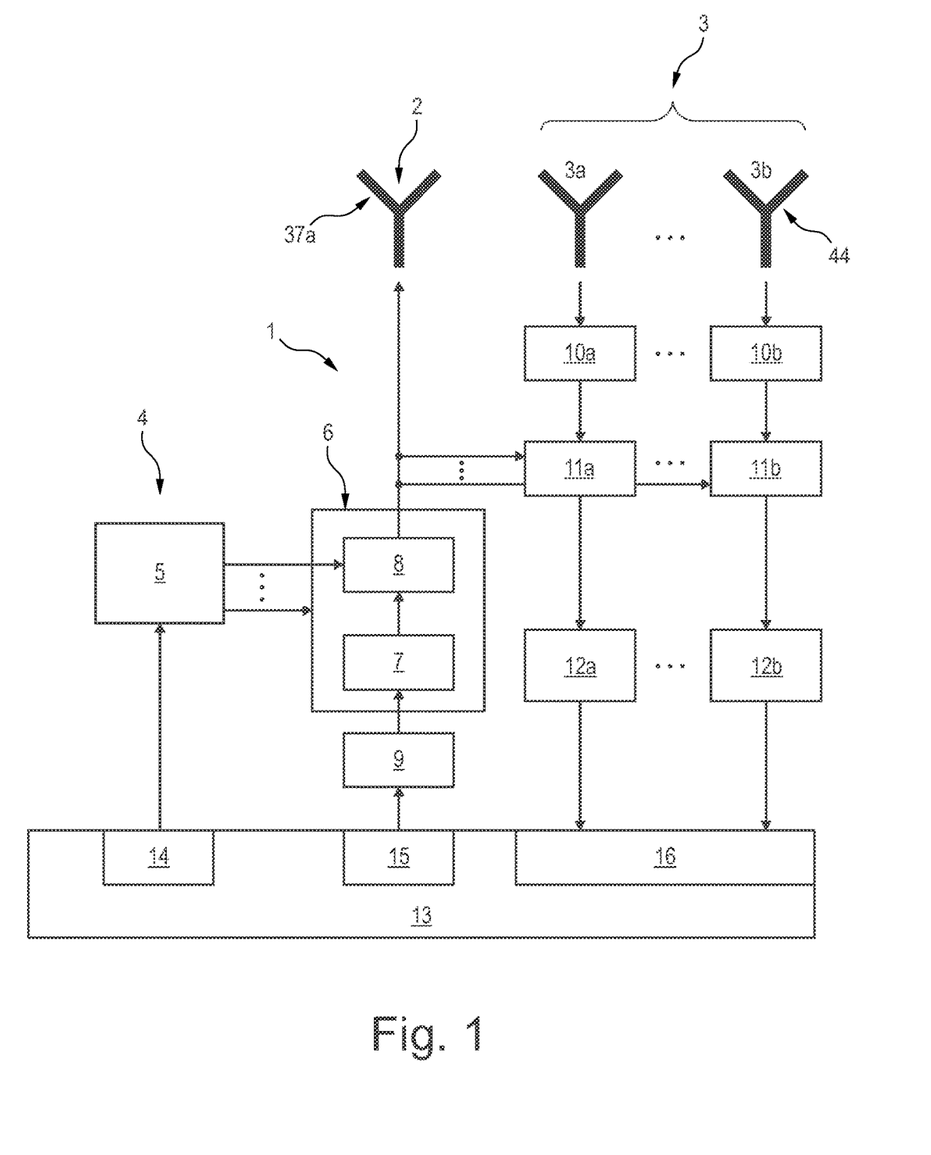
FIG. 1 is a radar unit of generation 2.0 by the applicant.

FIG. 1 shows, in a schematic depiction, a structure of a radar unit 1. The radar unit 1 exhibits, for example, the structure of a radar unit, known per se, of generation 2.0 by the applicant. The radar unit 1 is also referred to as a radar sensor 1. The radar unit 1 comprises a transmission path 2 and a receiving path 3, having at least two receiving channels 3a and 3b. Furthermore, a control path 4 is provided. The control path 4 comprises an activation means 5 (external MMIC control: Monolithic Microwave Integrated Circuit) for a high frequency circuit 6, in particular an MMIC 6 (Monolithic Microwave Integrated Circuit), which contains a voltage controlled oscillator 7 (VCO) and some peripheral components, in particular an output unit 8. Furthermore, a DAC (Digital Analog Converter) 9 is disposed in the transmission path 2. Furthermore, an LNA (Low Noise Amplifier) 10 (LNA 10a, LNA 10b), a mixer 11 (mixer 11a, mixer 11b), and a band-pass filter 12 (band-pass filter 12a, band-pass filter 12b) are disposed, respectively, in each receiving channel 3a, 3b of the receiving channel path 3.

The control path 4, the transmission path 2 and the receiving path 3 are connected to a DSP (Digital Signal Processor) 13, wherein the control path 4 is connected to an SPI 1 interface 14, the transmission path is connected to an SPI 2 interface 15, and the receiving path 3 is connected to an analog/digital converter 16 (ADC) of the DSP 13.

Figure 2:
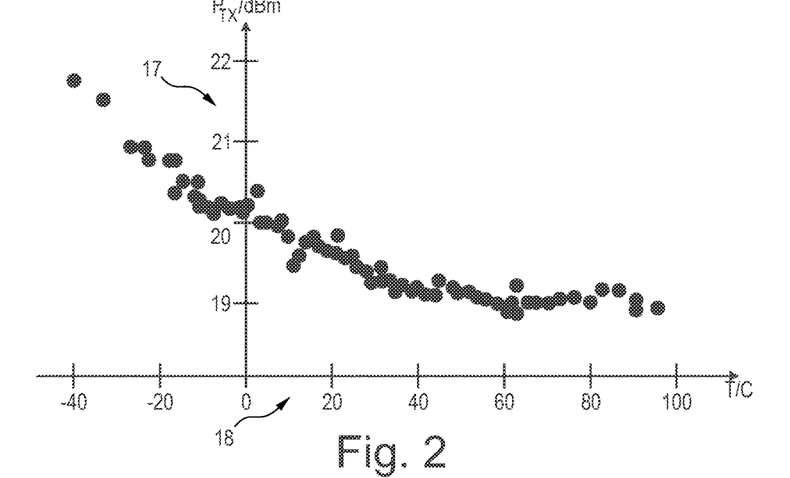
FIG. 2 is a diagram, depicting a relationship of a transmission output from a radar unit to an environmental temperature.

FIG. 2 shows the transmission output $P_{tx}$ generated in the output unit 8, plotted in $dB_m$ on the y-axis 17 as a function of the temperature in centigrade, which is plotted on the x-axis 18. The temperature is the temperature of the MMIC 6, and thus the environmental temperature of a radar sensor 1. At 0° C. the transmission output amounts to ca. 20 $dB_m$ and increases at low temperatures up to 22 $dB_m$ at −40° C. At higher temperatures the transmission output sinks to ca. 19 $dB_m$. At the reference temperature of 20° C., a transmission signal having a transmission output of 19 $dB_m$ is generated. In operation, a temperature sensor (not shown in FIG. 1) is disposed on a motherboard, and continually measures the temperature. The control voltage value is determined from the difference in temperature to the reference temperature of 20° C. as well as the reference voltage value at 20° C. Preferably a quadratic function is selected as the approximation function thereby, which is reflected well by the temperature relationship depicted in FIG. 2. This approximation function comprises three coefficients, which are stored in the software for the DSP 13.

It is desirable to emit a constant transmission output of 20 $dB_m$ for the continuous operation of the radar sensor 1. For this reason, an MMIC control voltage is set in the operation thereof, as a function of the environmental temperature. The relationship shown in FIG. 2 of the transmission output to the temperature is the basis for this, for the tracking of the transmission output by means of the MMIC control voltage.

Figure 3:
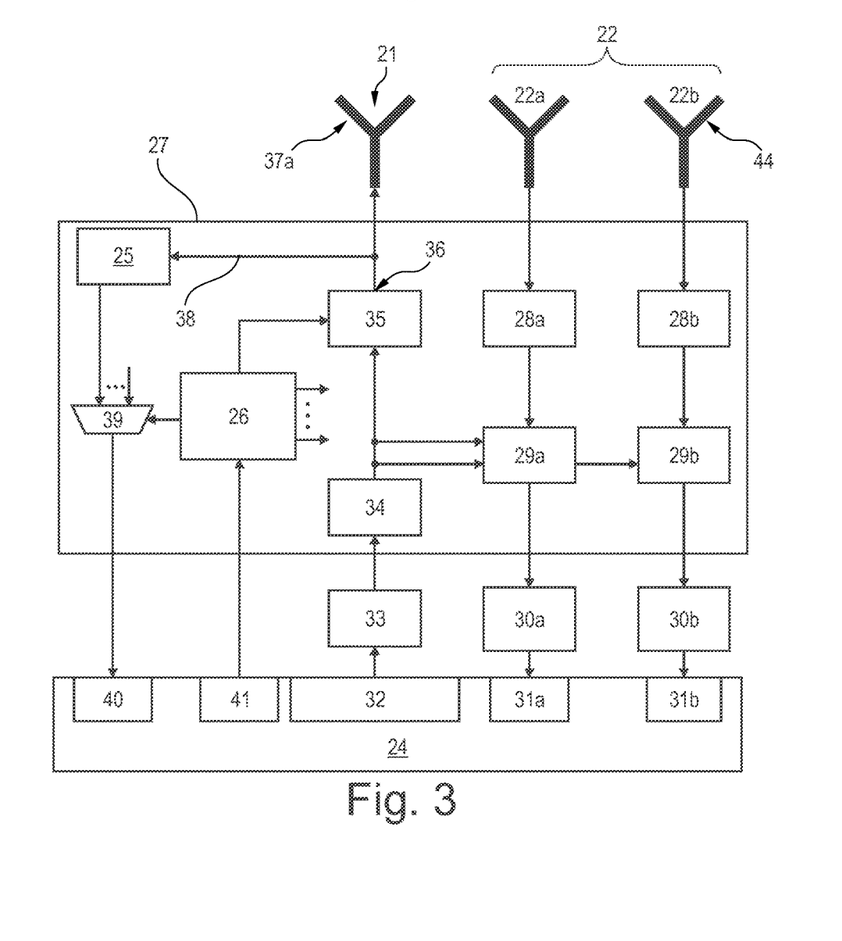
FIG. 3 is a structure of a radar unit of generations 3.0 and 3.5 by the applicant.

FIG. 3 shows another embodiment of a radar unit 20. The radar unit 20 is a radar unit from generation 3.0 and 3.5 by the applicant, having a transmission path 21 for generating transmission signals, and a receiving path 22 for recording received signals. The receiving path 22 has at least two receiving channels, depicted here as a first receiving channel 22a and a second receiving channel 22b.

The transmission path 21 and the receiving path 22 are connected to a digital signal processor (DSP) 24. In the method for operating the radar unit 20, it is provided that the emitted output signal is to be measured by means of an output sensor 25 and a prepared measurement signal is fed into an MMIC control unit 26 of a high frequency circuit 27.

The receiving path 22 has an LNA (Low Noise Amplifier) 28a, 28b, and a mixer 29a, 29b, respectively, in each receiving channel 22a and 22b. The mixer 29a, 29b, in each case, is connected to a band-pass filter 30a, 30b. The received signal can be fed into the digital signal processor 24 after the band-pass filter 30a, 30b, wherein the measurement signal is converted to a digital signal in each case, in an ADC (Analog/Digital Converter) 31a, 31b of the DSP 24. The transmission path 21 is activated via a digital/analog converter activator 32 and a DAC 33. The signal is fed into the high frequency circuit 27, and converted to an activation signal for an output unit 35 in a VCO (Voltage Modulated Oscillator) 34. The VCO 34 has a high frequency oscillator, in particular a 24 GHz oscillator. A frequency modulated transmission signal that is to be emitted is located at an outlet 36 of the output unit 35, which can be emitted via a transmission antenna 37. A connection 38 to the output sensor 25 is disposed between the output unit 35 and the transmission antenna 37, such that the transmission signal that is to be emitted can be measured directly. The measurement signal is converted to an analog measurement voltage thereby. The measurement signal can be fed into a multiplexer 39 connected to the output sensor 25. The outlet of the multiplexer 39 is connected to an ADC (Analog/Digital Converter) 40 of the signal processor 24, by means of which the measurement signal can be fed into the signal processor 24 and is available for activating the MMIC activation unit 26. The activation of the MMIC activation unit occurs via an interface 41 allocated to the signal processor 24 (SPI: Signal Processor Interface). The MMIC control unit 26 is connected to both the multiplexer 39 as well as the transmission path, in particular, it is connected to the output unit 35. The multiplexer 39 can be configured thereby by means of the MMIC activation unit 26. The output that is to be emitted can vary by approx. 10 dB by means of an analog input voltage at the output unit 35 of the transmission output.

The radar unit 20 depicted in FIG. 3 is distinguished not only by the additional components of the output sensor 25, but also by a higher degree of integration of the MMIC 27. The LNAs 28a and 28b and the mixers 29a and 29b of the receiving path 22 are integrated on the MMIC 27. Furthermore, the MMIC control unit 26 integrated on the MMIC 27 can be programmed and activated directly by the SPI 41 of the DSP 24. In addition, further MMIC modules (not shown) can be provided, which can be configured by the DSP 24. By this means, the transmission output of the radar unit 20 can be set in eight discreet steps, by means of which a transmission output that is misadjusted or has been altered by drift can be compensated for, in a manner analogous to the permanently programmed setting of the transmission output, by means of the temperature/transmission output curve stored in the DSP 14. A programmed curved of this type is not necessary in the DSP 24, because the transmission output can be measured directly here.

Figure 4:
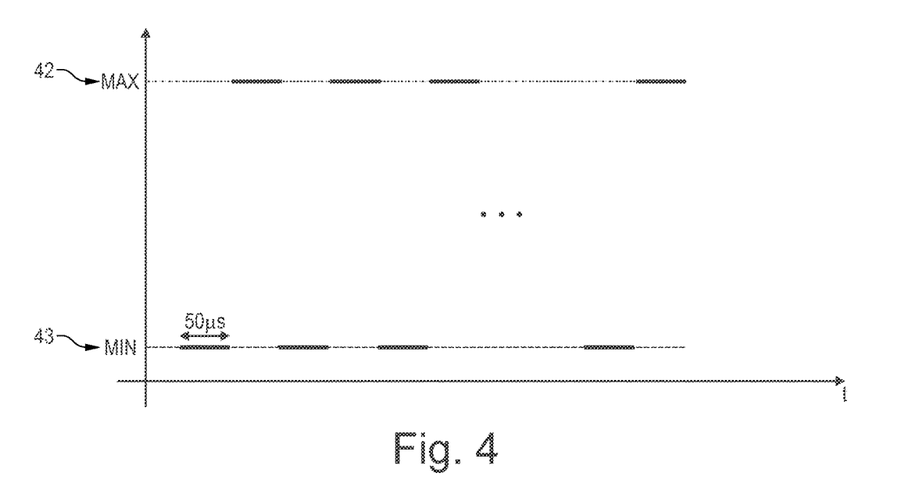
FIG. 4 is a diagram of a switching sequence in a diagnosis cycle.

FIG. 4 shows an exemplary diagram of transmission output steps that can be set, having maximum values 42 and minimum values 43. The transmission output of the transmission signal can thus alternate between the minimum output 43 and the maximum output 42. The transmission signal has, in addition to the constant VCO frequency of 24 GHz set by means of the VCO 34, an amplitude modulated component at frequencies above and below the VCO frequency. The spacings of the maximum and minimum frequencies of the transmission signal to the set VCO frequency (24 GHz) are a whole number multiple of the frequency of the switching sequence thereby, in this case ±N*10 kHz, where N=1, 2, 3, . . . .

The transmission signal that has been modified in this manner can be fed into the receiving channels 22a and 22b, in part by direct cross-coupling between the transmission antenna 37 and the receiving antennas (for two receiving channels), and in part by reflection at the sensor radome (not shown), and mixed with the modulated VCO signal or the un-modulated signal of the VCO in the baseband. The baseband signals obtained in this manner also contain, in both cases, aside from constant components that are dependent on the mixer when the switch-ability of transmission output is intact, the set frequencies at ±N*10 kHz, N=1, 2, 3, . . . .

After passing through the band-pass filter 30a and 30b, these measurement signals can be sampled by the ADC 31a and 31b of the DSP 24, and analyzed by means of a special signal processing.

Figure 5:
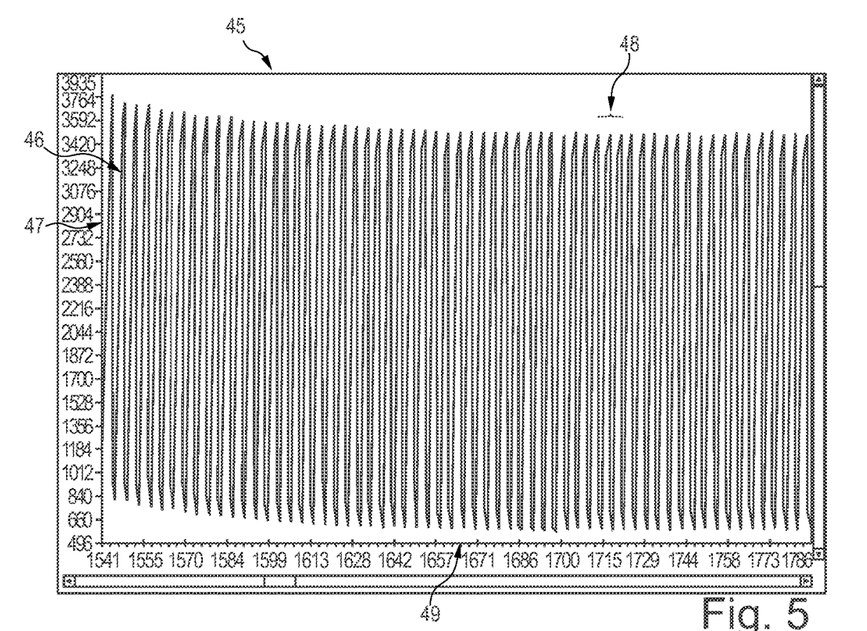
FIG. 5 is a diagram of a measurement signal for a receiving channel.

FIG. 5 shows an exemplary measurement signal 45 of the receiving channels 22a, 22b of the radar unit 20, recorded by means of a receiving antenna 44. The measurement signal 45 is a frequency modulated signal, and has an amplitude 46, which describes an output P of the measurement signal 45, and is plotted on the y-axis 47 as a function of time, wherein the time is plotted on the x-axis 49. Moreover, the measurement signal 45 has an alternating frequency 48. The alternating frequency 48 of the amplitude 46 corresponds to the set frequency of 10 kHz. By alternating the measurement signal 45 between a maximum and a minimum, corresponding to the maximum 42 and the minimum 43 of the switching sequence for the transmission output, the signal exhibits a large dynamic, which enables a robust detection of the frequency component. A robust detection is to be understood here to mean that the detection is not subject to disturbances. The measurement signal 45 can be processed and analyzed by using a Fourier transformation.

A malfunction of a hardware component, e.g. a defect, which can no longer be changed, in particular, can no longer be switched (output unit 35), can be detected by an analysis of the measurement signal 45. The switching frequency, which is depicted in FIG. 4, would be absent in the measurement signal 45 of the receiving channel 22 in the case of a hardware malfunction.

Figure 6:
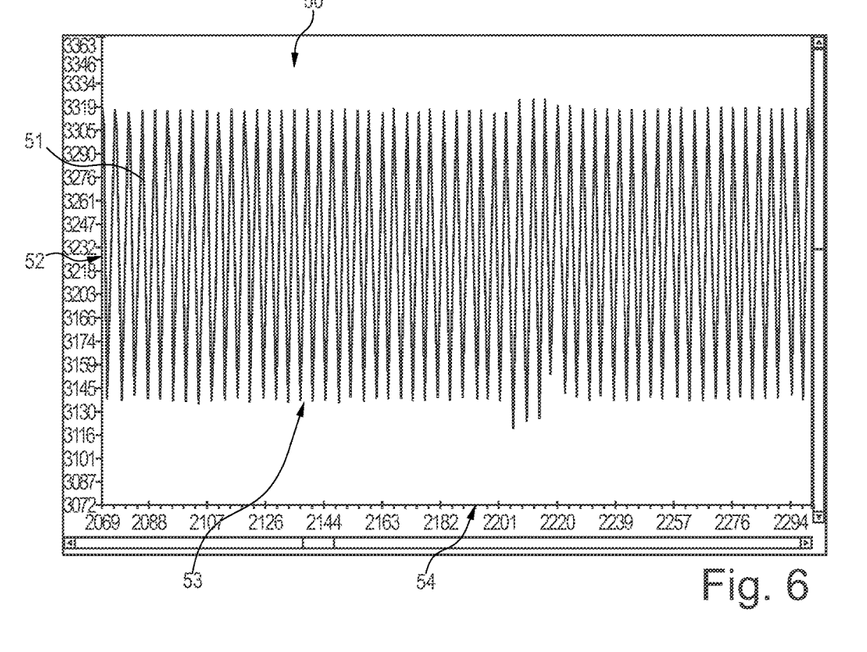
FIG. 6 is a diagram of a voltage, corresponding to the measurement signal for the transmission output.

FIG. 6 shows a depiction of a measurement signal 50 of the output sensor 25, which shows a voltage 51 plotted on the y-axis 52, as a function of time 53, plotted on its x-axis 54, corresponding to the transmission output of the measurement signal 50. The detection of a switching sequence for the measurement signal 50 can occur here by means of a Fourier transformation of the measurement signal 50. If the measurement capability of the transmission output is defined, then a strong frequency component in the spectrum of the measurement signal 50 can be registered with the alternating frequency of the transmission output, e.g. 10 kHz. If a measurement capability of the signal—meaning, if a measurement signal is no longer measured by the output sensor 25, due, for example, to a hardware defect or malfunction of a hardware component of the MMIC 27, the component of the switching sequence depicted in FIG. 4 is no longer visible in the measurement signal 50.

Thus, a method for operating the radar unit 1, 20 is implemented with a two-step diagnosis concept, which enables both the diagnosis of the variability of the transmission output (for radar units 1, 20 having the configurations in FIG. 1 and FIG. 3) as well as the monitoring of the measurement capability of the transmission output (for radar units 20 having the configuration in FIG. 3).

This two-step diagnosis concept shall be explained in greater detail below, with respect to the individual method steps. In order to diagnose the variability of the transmission output for the output signal, a diagnosis and/or calibration cycle is executed. The diagnosis cycle typically takes 56 ms. No radar signal based scanning of the vehicle environment occurs during the diagnosis and/or calibration cycle. The diagnosis and/or calibration cycle is used to calibrate the frequency and for the diagnosis of the sensor itself. In the first step, a constant transmission frequency is set. The setting of the constant transmission frequency occurs via the DAC 9, 33, which is activated by the DSP 13, 24. The transmission output, with the constant transmission frequency of 24 GHz, for example, set at the VCO 7, 34, alternates between the minimum value 43 and the maximum value 42. The switching sequence for this is shown in FIG. 4. The transmission signal has, in addition to the constant frequency in the range of 24 GHz, an amplitude modulated component at frequencies above or below the VCO frequency. The spacings of the frequencies above or below the VCO frequency amount to a whole number multiple of the frequency of the switching sequence, of ±N*10 kHz, where N=1, 2, 3, . . . .

The signal modulated in this manner is emitted by the transmission antenna 37a, or in a manner corresponding to FIG. 1, and recorded by the receiving antenna 44, or in a manner corresponding to FIG. 1. Here, the transmission signal can arrive directly at the receiving antenna 44, or in a manner corresponding to FIG. 1, by means of cross-coupling, or can be scattered by the radar unit 1, 20 at the radome. The received signal is mixed in the respective mixer 11a, 11b (radar unit 1) and 29a, 29b (radar unit 20) in the baseband, wherein, with the radar unit 1 of the generation 2.0, the MMIC internal mixer signal is modulated, and with the radar unit 20 of the generation 3.0, the signal is not modulated. The baseband signals contain, in both cases, aside from the constant components dependent on the mixer, the frequency components that are set by the switching sequence (±N*10 kHz, N=1, 2, 3, . . . ). After passing through the respective band-pass filters 12a, 12b (radar unit 1) and 30a, 30b (radar unit 20), the respective measurement signal (in this case, the measurement signal concerns the received signal after the mixer and the band-pass filter) is sampled, by means of the ADCs 16 (radar unit 1) and 31a, 31b (radar unit 20) disposed in the DSP 13 (radar unit 1) and 24 (radar unit 20), and analyzed by programs stored internally. A measurement signal of this type is shown in FIG. 5 for a radar unit 20. The alternating frequency of the amplitude 46 corresponds to the frequency of 10 kHz. The stored programs for analysis of the measurement signals preferably include a Fourier transformation.

If, for example, the switching capability of the transmission output is not defined, due to a hardware defect, then these frequency components of 10 kHz will be absent. In particular, it can be detected whether one of the components, LNA 10a, 10b or 28a, 28b, mixer 11a, 11b or 29a, 29b, band-pass filter 12a, 12b or 30a, 30b, is defective in one of the receiving channels 3a, 3b (radar unit 1) or 22a, 22b (radar unit 20), because in this case, the received signal would not be applied as a measurement signal to the ADC 16 or 31a, 31b of the DSP 13 or 24. If the received signal measurement signal is applied to the respective ADC 16 or 31a, 31b, then, conversely, the conclusion can be reached that the receiving channels 3a, 3b or 22a, 22b are functional, and there is no malfunction.

A second part of the operation concept exhibits the second part of the diagnosis concept, by means of which the transmission output of the radar unit 20 can be monitored and readjusted. The monitoring can occur thereby independently of a temperature reading by means of a temperature sensor, as is the case with the radar units 1 of generation 2.0. The transmission output is measured directly thereby, specifically, in particular, before the transmission signal is emitted. The measurement is obtained by means of an output sensor 25, which is disposed between the output unit 35 and the transmission antenna 37. In particular, the measurement of the transmission output can occur in parallel to the first part of the diagnosis concept. During the execution of the switching sequence shown in FIG. 4, between the maximum value 42 and the minimum value 43 of the transmission output, the analog signal from the output sensor 25 integrated on the MMIC 27 is fed into the ADC 40 of the DSP 24 via the multiplexer 39. For this, the MMIC 27 has a separate PIN (not shown in FIG. 3). The output measurement signal is sampled in the DSP 24 at a sampling rate of, for example, 40 kHz. The resulting signal is, for example, the voltage signal 50 shown in FIG. 6. The alternating frequency 48 corresponds precisely thereby to the switching sequence of the transmission signal. The analysis of the output measurement signal can comprise a Fourier transformation.

If a measurability of the transmission signal is defined, then a strong frequency component in the alternating frequency of the transmission output, e.g. the previously specified 10 kHz, is defined in the output measurement signal. If the measurability of the transmission signal is not defined, this can be due, for example, to a defect in the hardware, e.g.

the output unit, and thus, the component of the switching sequence in the measurement signal 50 depicted in FIG. 6 will be absent.

On the whole, due to the large dynamic between the minimum value 43 and the maximum value 42, a diagnosis of the transmission output, that is not subject to disturbances, is ensured, and a robust diagnosis of the measurability of the transmission output for the radar unit is obtained.

LIST OF REFERENCE SYMBOLS

1 radar unit
2 transmission path
3 receiving path
4 control path
5 MMIC control unit
6 monolithic microwave integrated circuit: MMIC
7 voltage controlled oscillator: VCO
8 output unit
9 digital/analog converter: DAC
10a, 10b low noise amplifier: LNA
11a, 11b mixer
12a, 12b band-pass filter
13 digital signal processor: DSP
14 signal processor interface: SPI 1
15 signal processor interface: SPI 2
16 analog/digital converter: ADC
17 y-axis in FIG. 2, output $P_{TX}$
18 x-axis in FIG. 2, temperature
20 radar unit of generation 3.0, 3.5
21 transmission path
22 receiving path
24 digital signal processor: DSP
25 output sensor
26 MMIC control unit
27 monolithic microwave integrated circuit: MMIC
28a, 28b low noise amplifier: LNA
29a, 29b mixer
30a, 30b band-pass filter
31a, 31b analog/digital converter: ADC
32 DAC activation
33 digital/analog converter: DAC
34 voltage controlled oscillator: VCO
35 output unit
36 outlet of the output unit
37a transmission antenna
38 line between the output unit 35 and the output sensor 25
39 multiplexer
40 analog/digital converter: ADC
41 signal processor interface: SPI
42 maximum value
43 minimum value
44 receiving antenna
45 measurement signal
46 amplitude of the measurement signal 45
47 y-axis in FIG. 5
48 frequency component of the measurement signal 45
49 x-axis in FIG. 5, time t
50 measurement signal, voltage measurement signal
51 amplitude of the measurement signal 50
52 y-axis in FIG. 6
53 frequency component of the measurement signal 50
54 x-axis in FIG. 6, time t

The invention claimed is:
1. A radar unit for transmitting and receiving a signal in a frequency band, comprising:

a control means;

a monolithic microwave integrated circuit (MMIC), the monolithic microwave integrated circuit comprising:

a voltage controlled oscillator for generating a transmission signal;

an output unit in communication with the voltage controlled oscillator for modulating the transmission signal and applying a mono-frequency switching sequence to the transmission signal;

an output sensor configured to measure the transmission signal from the output unit;

a monolithic microwave integrated circuit activation unit and a multiplexer connected to the output sensor, wherein the MMIC activation unit is connected to the output unit and the multiplexer; and wherein the monolithic microwave integrated circuit is configured to activate the output unit and the multiplexer is configured to feed a measurement signal of the output sensor to a digital signal processor of the control means;

a transmission antenna in communication with the output unit for emitting the transmission signal;

at least one receiving antenna for receiving a received signal;

wherein the control means activates the monolithic microwave integrated circuit and processes the received signal; and wherein the digital signal processor is configured to detect the frequency of the switching sequence in at least one of the measurement signal and the received signal, and to toggle amplitude of the transmission signal by means of the mono-frequency switching sequence.

2. The radar unit according to claim 1, wherein the output sensor is connected to the transmission antenna and the output unit.

3. The radar unit according to claim 1 wherein the output sensor and the multiplexer are connected to the control means.

4. The radar unit according to claim 1 wherein the control means comprises the digital signal processor having a signal processing interface configured to program the MMIC activation unit.

5. The radar unit according to claim 1 wherein the multiplexer is connected to an analog/digital converter of the digital signal processor, and is configured to feed the measurement signal generated by the output sensor to the digital signal processor.

* * * * *